(12) United States Patent
Homann et al.

(10) Patent No.: US 6,929,317 B2
(45) Date of Patent: Aug. 16, 2005

(54) REMOVABLE ROOF ASSEMBLY FOR A MOTOR VEHICLE

(75) Inventors: Bodo Homann, Heimsheim (DE); Andre Scholz, Wiernsheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/716,867

(22) Filed: Nov. 20, 2003

(65) Prior Publication Data

US 2004/0155490 A1 Aug. 12, 2004

(30) Foreign Application Priority Data

Nov. 20, 2002 (DE) .......................................... 102 54 108

(51) Int. Cl.⁷ ............................... B60J 7/11; B60J 7/19
(52) U.S. Cl. ................... 296/218; 296/224; 292/DIG. 5
(58) Field of Search ............................. 296/218, 224; 292/DIG. 5

(56) References Cited

U.S. PATENT DOCUMENTS

| | | | |
|---|---|---|---|
| 3,476,437 A | | 11/1969 | Schroeder et al. |
| 3,683,993 A | * | 8/1972 | Perks .......................... 160/37 |
| 3,712,665 A | * | 1/1973 | Klein .......................... 296/218 |
| 4,664,436 A | | 5/1987 | Eyb |
| 4,830,426 A | * | 5/1989 | Schlachter et al. ......... 296/121 |
| 5,360,254 A | | 11/1994 | Sorimachi et al. |
| 5,957,511 A | * | 9/1999 | Homann et al. ............ 292/196 |
| 6,059,356 A | * | 5/2000 | Hoelzel et al. ............. 296/218 |

FOREIGN PATENT DOCUMENTS

| | | |
|---|---|---|
| DE | 1580535 | 12/1970 |
| DE | 14 55 743 | 5/1977 |
| DE | 34 13 379 | 10/1985 |
| DE | 37 15 764 | 11/1988 |
| DE | 41 37 344 | 5/1994 |
| DE | 94 06 435 | 7/1994 |
| JP | 05112141 | 5/1993 |
| JP | 06171373 | 6/1994 |

OTHER PUBLICATIONS

European Search Report mailed Mar. 5, 2004.

* cited by examiner

Primary Examiner—Dennis H. Pedder
(74) Attorney, Agent, or Firm—Crowell & Moring LLP

(57) ABSTRACT

A removable roof intended for a motor vehicle, particularly a passenger car, covers an opening between a windshield frame and a body frame structure of a body of the passenger car extending, for example, behind vehicle occupant seats. On the one hand, the roof is held in position by a form-lockingly operating fixing system and, on the other hand, by a locking system, which locking system is operative between the roof and the vehicle body frame structure constructed as a rollover bar system. In order to advantageously fasten the roof by the fixing system and the locking system on the windshield frame and the rollover bar system respectively, the locking system has at least one locking device cooperating with the rollover bar system and including an operating device with a locking pin which engages in a closing crank.

22 Claims, 5 Drawing Sheets

REMOVABLE ROOF ASSEMBLY FOR A MOTOR VEHICLE

BACKGROUND AND SUMMARY OF THE INVENTION

This application claims the priority of application number 10254108.6, filed in Germany on Nov. 20, 2002, the disclosure of which is expressly incorporated by reference herein.

The invention relates to a removable roof assembly for a motor vehicle. Preferred embodiments relate to removable roof assemblies for a passenger car which covers an opening between a windshield frame and a body frame structure of a body of the passenger car extending behind vehicle occupant seats, the removable roof is, on the one hand, held in position by a form-lockingly operating fixing system and, on the other hand, by a locking system, which locking system is operative between the roof and the vehicle body frame structure constructed as a rollover bar system.

The subject matter of this application is related to commonly assigned application Ser. Nos. 10/716,942; 10/716,941; and 10/716,943, filed herewith and based on respective German application nos. 10254130.2; 10254131.0; and 10254132.9.

A roof of the above-mentioned type known from German Patent Document DE 14 55 743 (corresponding U.S. Pat. No. 3,476,437) is fixed to a windshield frame by means of a form-locking fixing system and is fixed to a rollover bar system by means of a locking system. The locking system has a bolt held at the roof, which bolt is surrounded by an eccentric sleeve fastened to a shaft, the two latter devices being disposed on the rollover bar system. The shaft is accommodated by a bearing console and is connected with a manual lever, the bearing console and the manual lever extending away from the interior wall of the rollover bar system.

According to German Patent Document DE 41 37 344 A1, a rollover bar extends between an upper member part of a windshield frame and a body frame structure arranged behind backrests of vehicle seats. The vehicle body frame structure comprises a rollover bar system which spans a vehicle occupant compartment of the passenger car transversely to the longitudinal direction of the vehicle. The roof consists of a dimensionally stable material and is constructed as a single component, the roof being held in position by means of a fixing system and a locking system on the member part of the windshield frame and on the vehicle body structure respectively.

Furthermore, German Patent Document DE 94 06 435 relates to a roof which has two roof elements which are fitted together in a longitudinal center plane and are held on the windshield frame solely by means of a locking system. The locking system is equipped with a turning handle which, in the closed position, reaches under a tensioning slope of an interior covering by means of a nose.

It is an object of the invention to provide a removable roof for a passenger car which is securely held by means of a fixing system and a locking system in an appropriate manner with respect to its functions on a windshield frame structure and a vehicle body frame structure extending behind vehicle seats. However, in this case, it should also be ensured that, while its functioning is good and its components are easy to implement, the locking system is installed such that the occupants of the passenger car are largely protected.

According to the invention, this object is achieved by providing removable roof for a motor vehicle passenger car, which covers an opening between a windshield frame and a body frame structure of a body of the passenger car extending behind vehicle occupant seats, the removable roof is on the one hand, held in position by a form-lockingly operating fixing system and, on the other hand, by a locking system, which locking system is operative between the roof and the vehicle body frame structure constructed as a rollover bar system, wherein the locking system of the roof has at least one locking device cooperating with the rollover bar system and comprising an operating device with a locking pin which engages in a closing crank.

Important advantages achieved by means of the invention are that, as a result of the fixing system and the locking system, the roof or the roof elements can be connected in a simple manner with the windshield frame and the rollover bar system and can easily be detached from them. In this case, the locking system formed by at least one locking device establishes a firm connection between the roof and roof elements and the rollover bar system and is distinguished by a good functioning. The latter will also be promoted by the special constructive design of the operating device and of the closing crank as well as of the fixing system which operates between the operating device and the closing crank according to certain preferred embodiments in the invention. The design of the operating device and of the closing crank allow that the corresponding components are easy to produce and cooperate teleologically. The operating device is installed into the roof or the roof elements, its manual lever, in the closed position, taking up a sunk position which therefore largely protects the vehicle occupants. So that finally the roof or the roof elements, under the effect of the locking device, enter into a connection with the rollover bar system, which is appropriate for their function, a first and a second sealing section of a sealing body are provided between a rearward roof wall extension of a groove of the rollover bar system according to certain preferred embodiments of the invention.

Other objects, advantages and novel features of the present invention will become apparent from the following detailed description of the invention when considered in conjunction with the accompanying drawings.

DETAILED DESCRIPTION OF THE DRAWINGS

Figure 1:
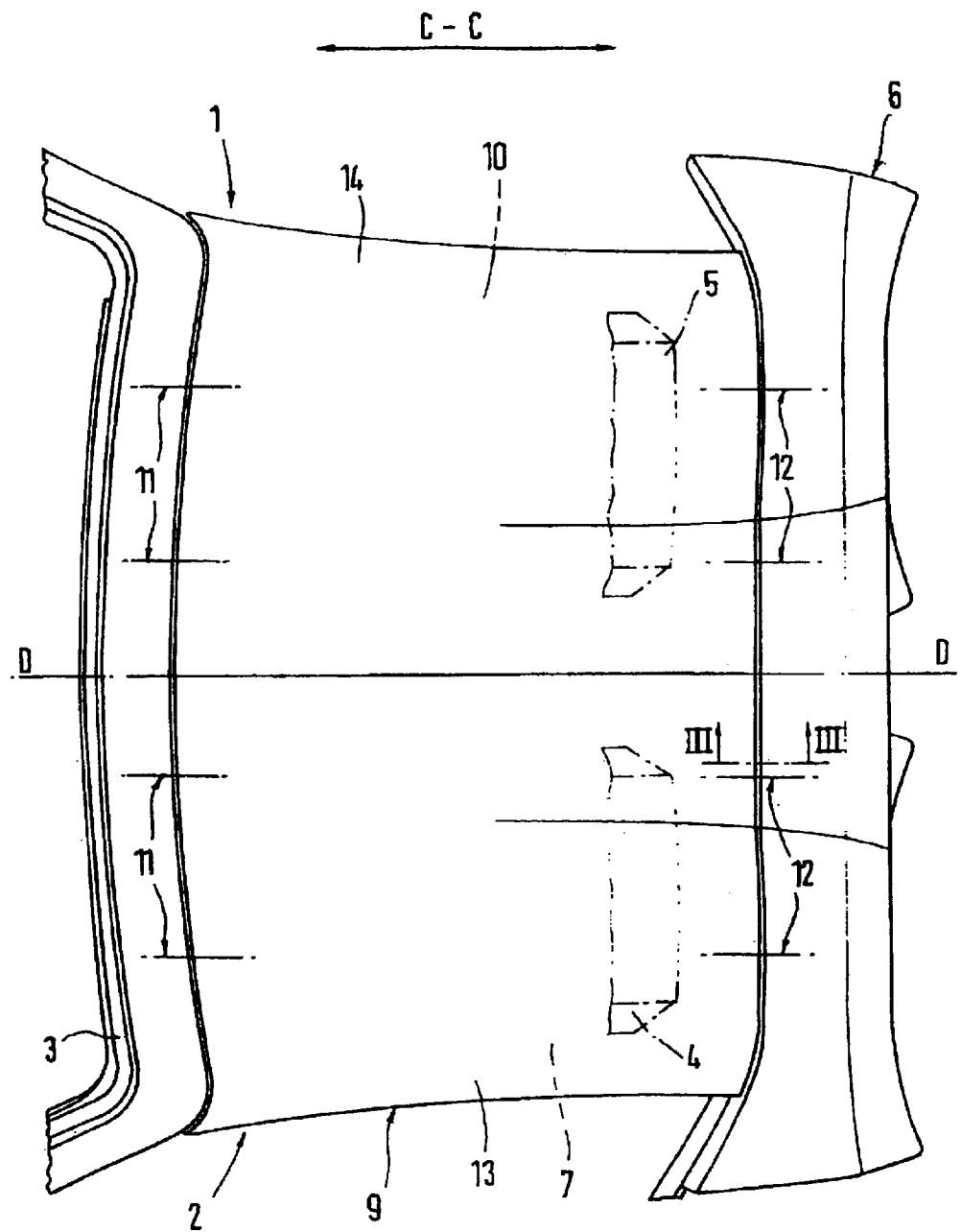
FIG. 1 is a partial top view of a passenger car with a removable roof, constructed according to preferred embodiments of the invention.

A passenger car 1 comprises an open vehicle body 2 having a windshield frame 3 and a rearward body frame structure 6 extending behind vehicle seats 4, 5, which body frame structure 6 comprises a rollover bar system 8 spanning a vehicle occupant compartment 7. The area between the windshield frame 3 and the rollover bar system 8 is free of supporting member structures which extend in the longitudinal direction C—C of the vehicle and reinforce the vehicle body 2. This means that all bending and torsion moments affecting the vehicle body 2 are absorbed by a floor system with its supporting members, which is not shown, so that relative movements between the windshield frame 3 and the rollover bar system 8, which occur, for example, during the driving operation of the passenger car, are taken into account in the case of the connection of a dimensionally stable removable roof 9 with the latter by constructive measures.

The roof 9 is formed of a firm or dimensionally stable plastic material, for example, of a highly stressable type, particularly a fiber-reinforced plastic material—CFK—, covers an opening 10 between the windshield frame 3 and the rollover bar system 8 or rearward body frame structure 6, and is connected with the vehicle body 2 by means of a form-lockingly operating fixing system 11 and a locking system 12.

Furthermore, the roof 9 comprises two roof elements 13, 14 which are fitted together without connecting elements, thus without hinges, in a longitudinal center plane D—D. Each roof element, for example, 13, interacts by means of at least one fixing system 11 with the windshield frame 3 and at least one locking system 12 formed by a locking device 15 with the rollover system 8. An example of a fixing system between the windshield frame and the roof is revealed in the initially mentioned German Patent Document DE 14 55 743, in which a pin mounted on the roof engages in a receiving device of the windshield frame.

Figure 2:
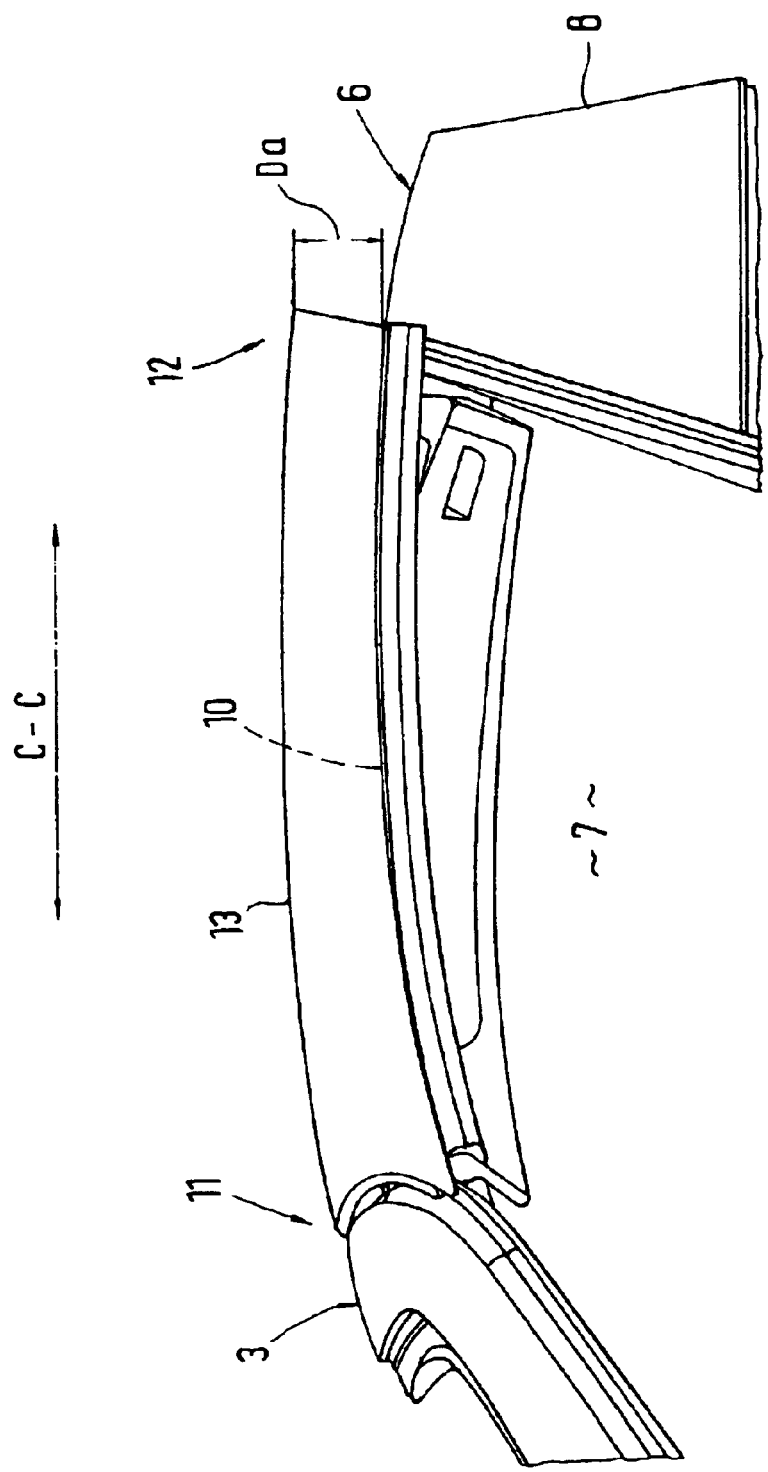
FIG. 2 is a view in the direction of the arrow A of FIG. 1.

The roof element 13 and the roof element 14 can be stored in a stacked form in a storage space, which is not shown, of the passenger car 1; when the passenger car is in the open condition. For mounting the roof element 13, it is engaged with the fixing system 11 by means of a movement directed in the driving direction E. In this case, the roof element 13 is slightly lifted, that is, by the extent Da—FIG. 2—, with respect to the rollover bar system 8. After a defined lowering of the roof element 13, the latter takes up its design position, and the locking device 15—FIG. 3—is operative. The demounting of the roof element 13 takes place in the reverse sequence. Comparable mounting steps are required for the mounting or detaching of the other roof element 14.

Figure 3:
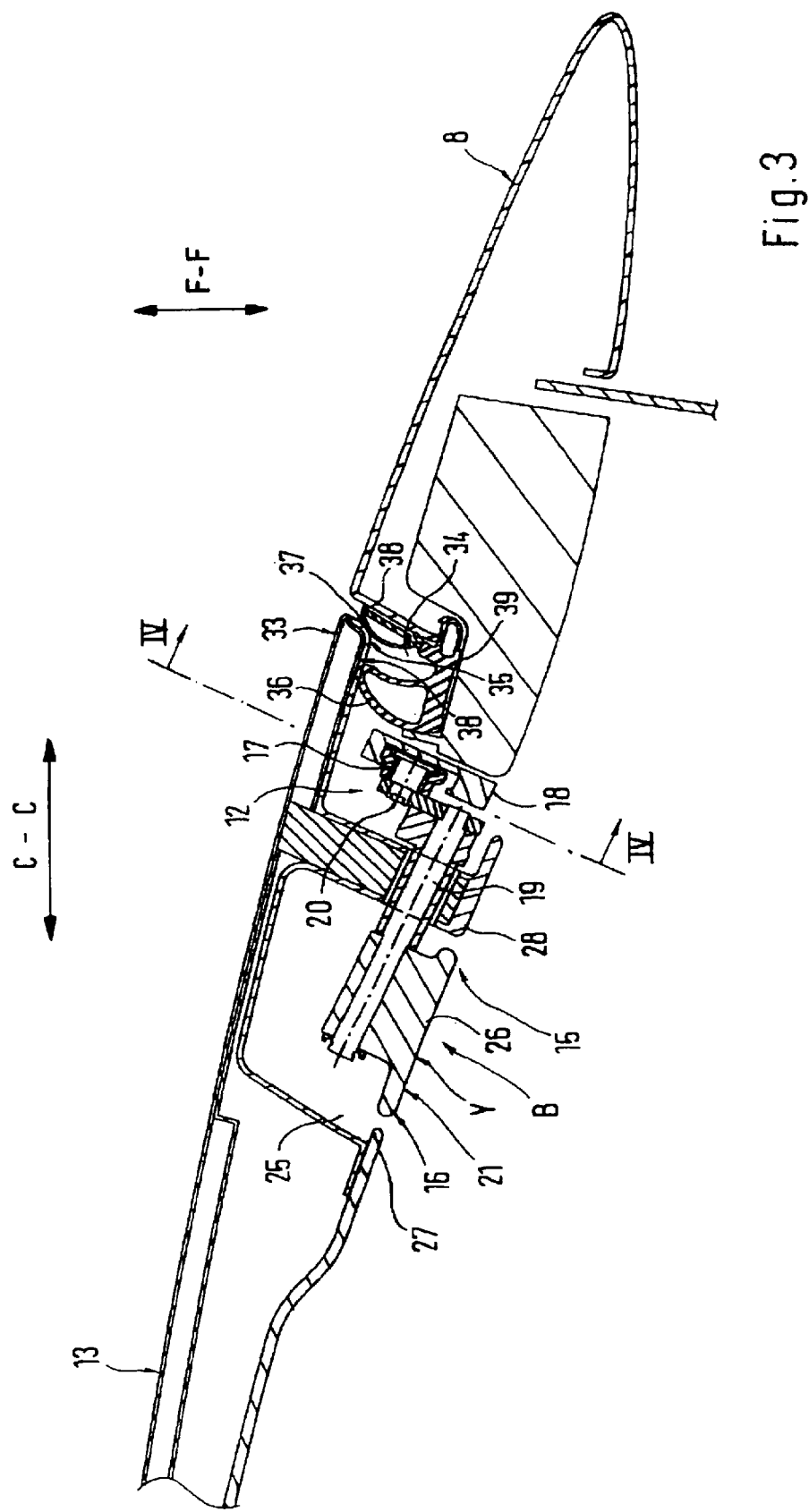
FIG. 3 is an enlarged sectional view according to Line III—III of FIG. 1.
Figure 4:
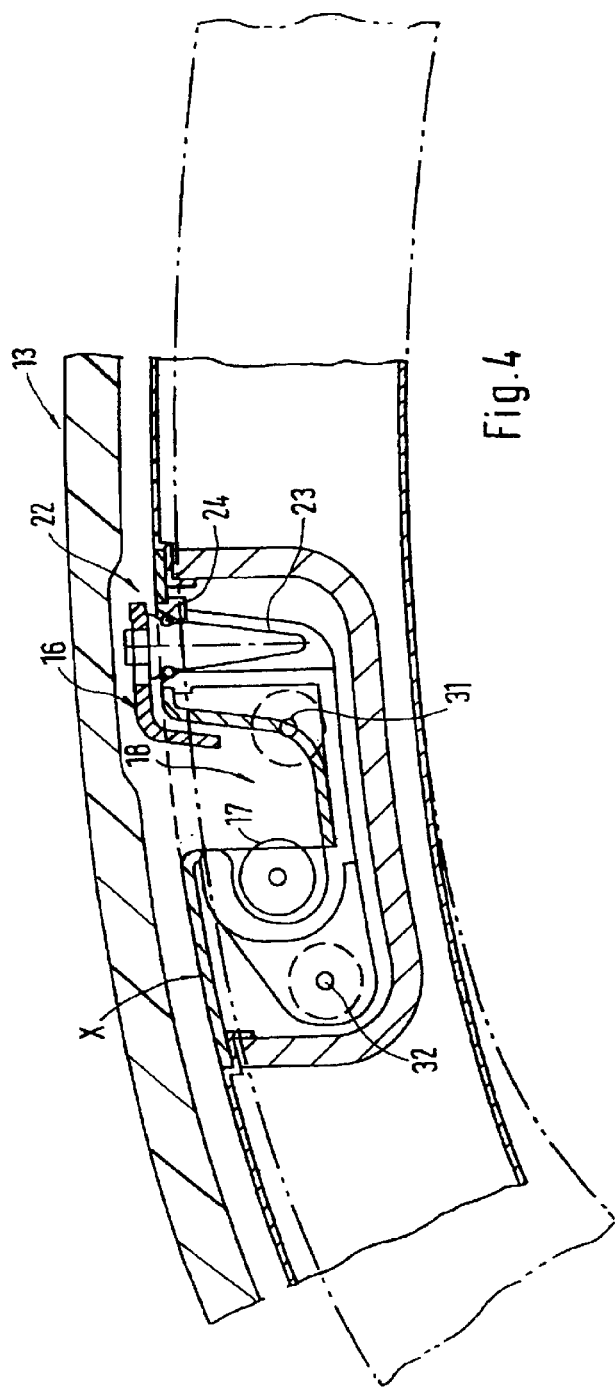
FIG. 4 is an enlarged sectional view according to Line IV—IV of FIG. 3.
Figure 6:
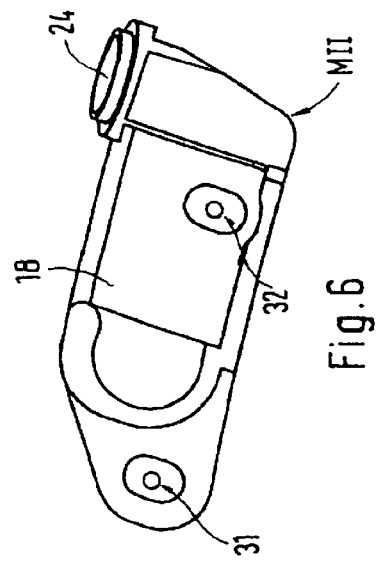
FIG. 6 is a view of a detail X of FIG. 4.
Figure 5:
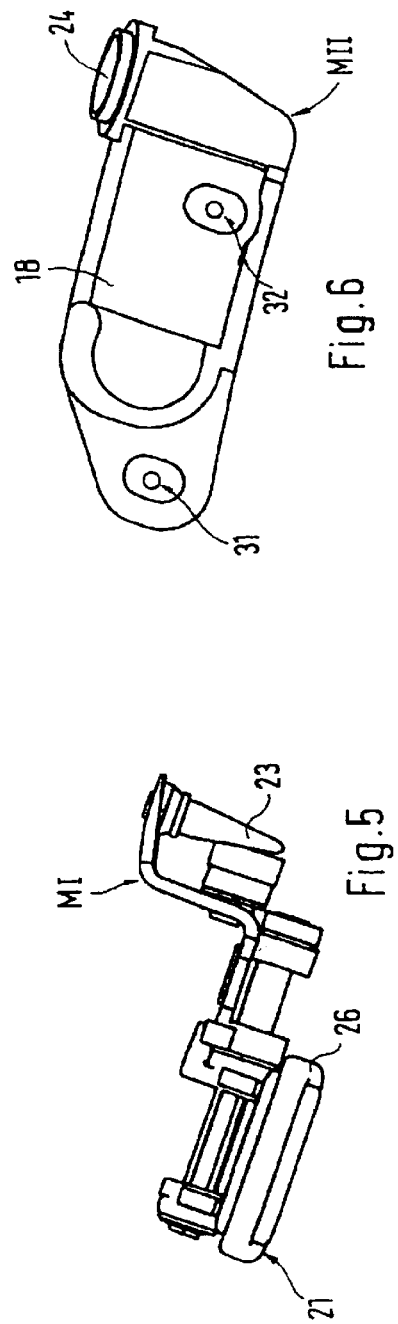
FIG. 5 is a view of a detail Y of FIG. 3.
Figure 7:
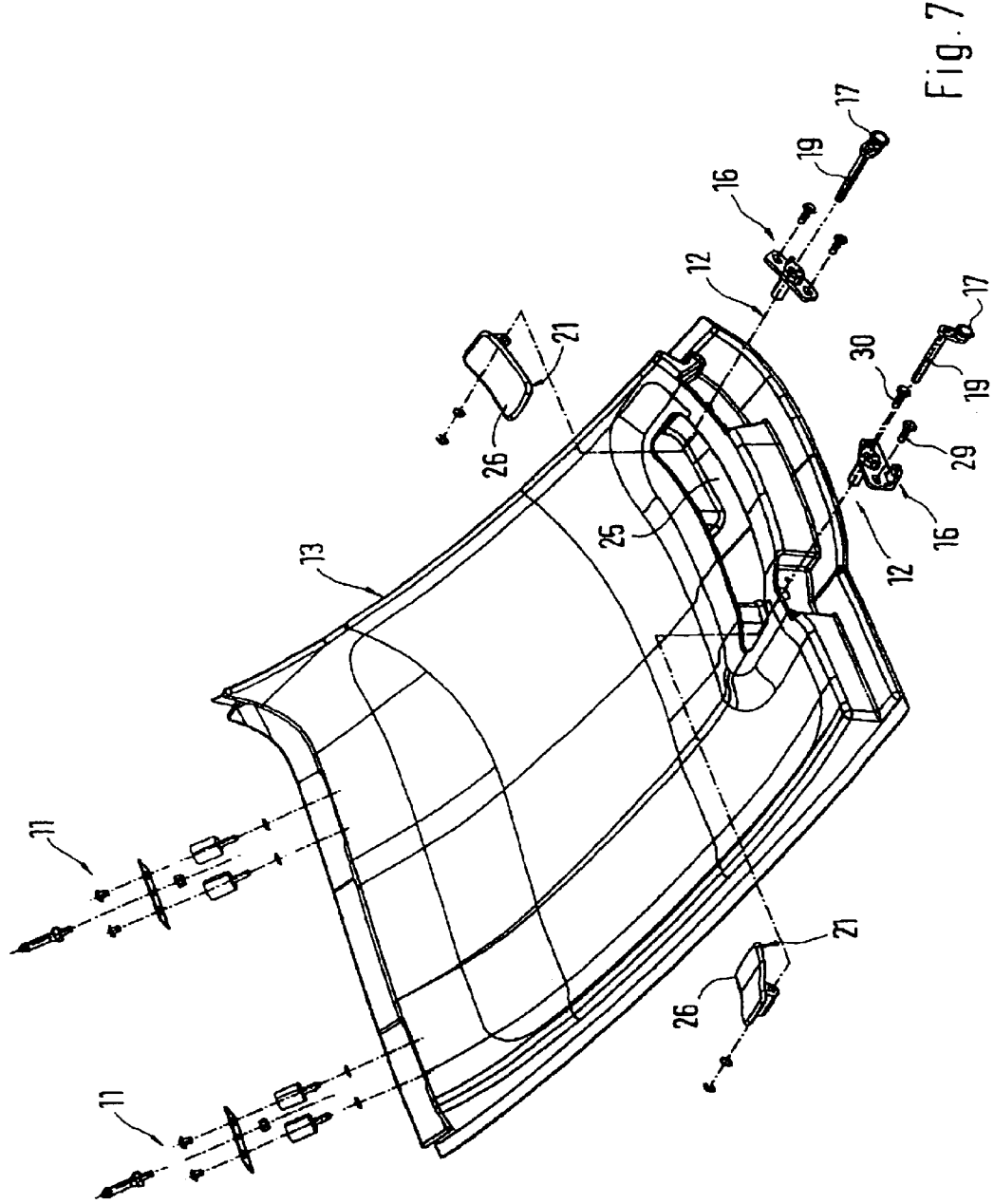
FIG. 7 is a diagonal rear view of a roof element according to FIG. 1, but rotated by 180°.

FIG. 3 illustrates that the locking device 15 of the locking system 12 has an operating device 16 with a locking pin 17 which cooperates with a closing crank 18 such that, viewed in the vertical direction F—F of the vehicle, the roof element 13 is tensioned against the rollover bar system 8. The operating device 16 is mounted on the roof element 13; the closing crank 18 is mounted on the rollover bar system 8. The locking pin 17 is part of a crank arm 20 connected with a swivel shaft 19 aligned in the longitudinal direction C—C of the vehicle, to which crank arm 20 a manual lever 21 is applied. So that, during the mounting, the roof element 13 is aligned in the correct position with respect to the rollover bar system 8, a fixing system 22—FIG. 4—is operative between the operating device 16 and the closing crank 18, which fixing system 22 has an upright, for example, conical pin 23 and a corresponding receiving opening 24 which is in an operative connection with the latter. In the illustrated embodiment, the pin 23 is mounted on the operating device 16 and the receiving opening 24 is provided on the closing crank 18. The manual lever 21 of the locking device 15 is accommodated in a recess 25 of the roof element 13. In this case, the manual lever 21 comprises a control plate 26 which is arranged flush with respect to the surfaces of interior walls 27 and 28 of the roof element 13 which bound the recess 25. In order to achieve a simple construction of the locking device 15, the manual lever 21, the swivel shaft 19 and the pin 23 are constructionally combined as a prefabricated module I, MI—FIG. 5—and fastened by means of screws 29, 30 at the roof element 13. The constructional combination of module II, MII correspondingly applies to the receiving opening 24 and the closing crank 18—FIG. 6—which, however, are held by means of screws 31, 32 on the rollover bar system 8. For each roof element 13 or 14, two mutually spaced operating devices 16 may be provided—FIG. 7—which are engaged in the pertaining closing cranks 18.

FIG. 3 illustrates how, by means of a rearward roof wall extension 33, the roof element 13 projects beyond a groove 34 of the rollover bar system 8 and, by means of a first sealing section 35 and second sealing section 36, extends to the groove 34 and the rollover bar system 8. In this case, the first sealing section 35 is provided between a free end 37 of the roof extension 33 and an upright wall 38 of the rollover bar system 8. In contrast, the second sealing section 36 is operative between an interior wall 38 of the roof extension 33 and a wall 39 of the groove 34 aligned in the direction of the roof extension 33.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Removable roof for a motor vehicle passenger car, which covers an opening between a windshield frame and a body frame structure of a body of the passenger car extending behind vehicle occupant seats, the removable roof including two roof elements, each of said roof elements being held in position by a form-lockingly operating fixing system and by a locking system, which locking system is operative between the roof and the vehicle body frame structure constructed as a rollover bar system, wherein the locking system has at least one locking device cooperating with the rollover bar system and comprising an operating device with a locking pin which engages in a closing crank, wherein the operating device is fastened to one of the roof elements and the closing crank is fastened to the rollover bar system, wherein the locking pin is mounted on a crank arm connected with a swivel shaft, which swivel shaft is connected with a manual lever, and wherein the manual lever comprises a control plate rotatable about a vehicle longitudinally extending axis and having a surface which is aligned flush with respect to interior walls of one of the roof elements.

2. Removable roof according to claim 1, wherein the form-lockingly operated fixing system is a first fixing system, and wherein a second fixing system is operative between the operating device and the closing crank.

3. Removable roof according to claim 2, wherein the second fixing system has an upright conical locking pin which cooperates with a receiving opening.

4. Removable roof according to claim 3, wherein the locking pin is mounted on the operating device, and the receiving opening is provided on the closing crank.

5. Removable roof according to claim 1, wherein the manual lever is accommodated in a roof element recess.

6. Removable roof according to claim 1, wherein the manual lever, the swivel shaft and the locking pin are constructionally combined and are fastened to one of the roof elements by means of screws.

7. Removable roof according to claim 5, wherein the manual lever, the swivel shaft and the locking pin are constructionally combined and are fastened to one of the roof elements by means of screws.

8. Removable roof according claim 3, wherein the receiving opening and the closing crank are constructionally combined and are fastened by means of screws on the rollover bar system.

9. Removable roof according to claim 1, wherein the two roof elements are fitted together in a longitudinal center plane of the passenger car, and
   wherein for each roof element, two operating devices are provided which cooperate with corresponding closing cranks on the rollover bar system.

10. Removable roof according to claim 9, wherein each roof element projects by means of a rearward roof wall extension over a groove of the rollover bar system and, by means of a first sealing section and a second sealing section, is sealed with respect to the groove of the rollover bar system.

11. Removable roof according to claim 10, wherein the first sealing section is provided between a free end of the roof wall extension and an upright wall of the rollover bar system.

12. Removable roof according to claim 10, wherein the second sealing section is operative between an interior wall of the roof wall extension and a horizontal wall of the groove.

13. A passenger car roof assembly comprising:
   a windshield frame,
   a body frame structure spaced from the windshield frame with a roof opening between the windshield frame and the body frame structure, and
   a removable roof member, including two roof elements operable to close at least part of the roof opening,
   each of said roof elements including a locking system operable to lock the roof element to the body frame structure,
   wherein the locking system includes at least one locking device cooperating with the body frame structure and comprising an operating device with a locking pin which engages in a closing crank,
   wherein the operating device is fastened to one of the roof elements and the closing crank is fastened to the body frame structure,
   wherein the locking pin is mounted on a crank arm connected with a swivel shaft, which swivel shaft is connected with a manual lever, and
   wherein the manual lever comprises a control plate which is rotatable about a vehicle longitudinally extending axis and which has a surface which is aligned flush with respect to interior walls of one of the roof elements.

14. A passenger car roof assembly according to claim 13, wherein the body frame structure is part of a vehicle rollover bar system.

15. A passenger car roof assembly according to claim 13, wherein the body frame structure is part of a vehicle rollover bar system, and
   wherein for each roof element, two operating devices are provided which cooperate with corresponding closing cranks on the body frame structure.

16. A passenger car roof assembly according to claim 15, wherein each roof element projects by means of a rearward roof wall extension over a groove of the body frame structure and, by means of a first sealing section and a second sealing section, is sealed with respect to the groove of the body frame structure.

17. A passenger car roof assembly according to claim 16, wherein the first sealing section is provided between a free end of the roof wall extension and an upright wall of the rollover bar system.

18. A passenger car roof assembly according to claim 16, wherein the second sealing section is operative between an interior wall of the roof wall extension and a horizontal wall of the groove.

19. A dimensionally stable removable roof member for use in a passenger car assembly having a roof opening bounded by a windshield frame and a rollover bar assembly spaced from the windshield frame, said roof member including two roof elements, each of said roof elements including form locking means at one end operable to form lockingly engage with the windshield frame and roof element locking system structure at an opposite end operable to lockingly engage with a rollover bar locking system structure at the rollover bar assembly,
   wherein the roof element locking system structure includes an operating device with a locking pin and a closing crank engageable with the locking pin,
   wherein the operating device is fastened to one of the roof elements and the closing crank is fastened to the rollover bar assembly,
   wherein the locking pin is mounted on a crank arm connected with a swivel shaft, which swivel shaft is connected with a manual lever, and
   wherein the manual lever comprises a control plate which is rotatable about a vehicle longitudinally extending axis and which has a surface which is aligned flush with respect to interior walls of the one of the roof elements.

20. A roof member according to claim 19, wherein the manual lever is accommodated in a recess of the one of the roof elements.

21. A roof member according to claim 19, wherein the manual lever, the swivel shaft and the locking pin are constructionally combined and are fastened by means of screws on the one of the roof elements.

22. A locking system assembly for locking a rear end of a dimensionally stable roof member to a rollover bar assembly in a passenger car roof assembly, the dimensionally stable roof member being one of two dimensionally stable roof members adapted to cover a roof opening between a windshield frame and a rollover bar assembly,
   wherein the locking system includes at least one locking device which in use cooperates with the rollover bar assembly and includes an operating device with a locking pin which engages in a closing crank,
   wherein the operating device is fastened to the one of the dimensionally stable roof members and the closing crank is fastened to the rollover bar assembly,
   wherein the locking pin is mounted on a crank arm connected with a swivel shaft, which swivel shaft is connected with a manual lever, and
   wherein the manual lever comprises a control plate which is rotatable about a vehicle longitudinally extending axis and which has a surface which is aligned flush with respect to interior walls of the one of the dimensionally stable roof members.

* * * * *